United States Patent
Norli

(10) Patent No.: US 12,209,991 B2
(45) Date of Patent: Jan. 28, 2025

(54) METHOD AND DEVICE FOR NON-DESTRUCTIVE TESTING OF A PLATE MATERIAL

(71) Applicant: NDT GLOBAL AS, Øvre Ervik (NO)

(72) Inventor: Petter Norli, Oslo (NO)

(73) Assignee: NDT GLOBAL AS, Øvre Ervik (NO)

( * ) Notice: Subject to any disclaimer, the term of this patent is extended or adjusted under 35 U.S.C. 154(b) by 378 days.

(21) Appl. No.: 17/427,170

(22) PCT Filed: Jan. 31, 2020

(86) PCT No.: PCT/NO2020/050024
§ 371 (c)(1),
(2) Date: Jul. 30, 2021

(87) PCT Pub. No.: WO2020/159385
PCT Pub. Date: Aug. 6, 2020

(65) Prior Publication Data
US 2022/0099629 A1 Mar. 31, 2022

(30) Foreign Application Priority Data
Jan. 31, 2019 (NO) .................................. 20190133

(51) Int. Cl.
*G01N 29/04* (2006.01)
*G01N 29/24* (2006.01)
(Continued)

(52) U.S. Cl.
CPC ....... *G01N 29/041* (2013.01); *G01N 29/2437* (2013.01); *G01N 29/348* (2013.01);
(Continued)

(58) Field of Classification Search
CPC ...... G01N 29/04; G01N 29/041; G01N 29/24; G01N 29/2437; G01N 29/34–52;
(Continued)

(56) References Cited

U.S. PATENT DOCUMENTS

| 3,165,922 A | * | 1/1965 | Worlton | ............ | G01N 29/2487 |
| | | | | | 73/642 |
| 3,512,400 A | * | 5/1970 | Lynnworth | ............ | G01N 29/27 |
| | | | | | 73/598 |

(Continued)

FOREIGN PATENT DOCUMENTS

EP 3 407 060 A1 11/2018

OTHER PUBLICATIONS

Chimenti D. E. et al., "Nondestructive evaluation of composite laminates by leaky Lamb waves," Ultrasonics, IPC Science and Technology Press Ltd. Guildford, GB, vol. 29, No. 1, Jan. 1, 1991 (Jan. 1, 1991), pp. 13-21, XP025703823.

(Continued)

*Primary Examiner* — Nguyen Q. Ha
(74) *Attorney, Agent, or Firm* — Jon E. Gordon; Haug Partners LLP

(57) ABSTRACT

It is disclosed a method and device for testing a plate material (1) for presence of pits and holes (3) in the plate material (1), said method including the steps of: transmitting an acoustical signal from a transmitting transducer (2) facing the plate material (1) and positioned a distance from the plate material, a frequency of the transmitted signal and an angle of incidence of the transmitted signal towards the plate material being adapted to promote formation of Lamb signals travelling in the plate material, receiving an acoustical signal returned from the plate material in a receiving transducer (4) also facing the plate material at a distance from the plate material, the receiving transducer (4) being located a distance from said transmitting transducer (2) along a direction of the plate material, time gating the received signal to identify a tail part (8) of the received signal carrying information of the Lamb signals having (Continued)

travelled in the material, and determining the energy content in a Lamb mode in said tail part (8) of the received signal.

9 Claims, 3 Drawing Sheets

(51) Int. Cl.
*G01N 29/34* (2006.01)
*G01N 29/38* (2006.01)
(52) U.S. Cl.
CPC ....... *G01N 29/38* (2013.01); *G01N 2291/023* (2013.01); *G01N 2291/028* (2013.01); *G01N 2291/0427* (2013.01); *G01N 2291/102* (2013.01); *G01N 2291/2636* (2013.01)
(58) Field of Classification Search
CPC .................. G01N 29/348; G01N 29/38; G01N 2291/023; G01N 2291/028; G01N 2291/0427; G01N 2291/102; G01N 2291/2636
See application file for complete search history.

(56) References Cited

U.S. PATENT DOCUMENTS

| | | | | | |
|---|---|---|---|---|---|
| 3,572,099 | A | * | 3/1971 | Wieczorek | G01B 17/02 73/602 |
| 4,674,334 | A | * | 6/1987 | Chimenti | G01N 29/041 73/644 |
| 4,976,150 | A | | 12/1990 | Deka | |
| 6,092,421 | A | * | 7/2000 | Bar-Cohen | G01N 29/223 73/624 |
| 6,543,288 | B1 | * | 4/2003 | Blouin | G01L 5/042 73/159 |
| 2009/0049916 | A1 | | 2/2009 | Sargent | |
| 2009/0078049 | A1 | | 3/2009 | Sinha | |
| 2016/0109604 | A1 | | 4/2016 | Zeroug et al. | |
| 2018/0017533 | A1 | | 1/2018 | Norli et al. | |
| 2018/0031525 | A1 | | 2/2018 | Philtron et al. | |
| 2020/0141906 | A1 | * | 5/2020 | Kimura | G01N 29/38 |

OTHER PUBLICATIONS

Zeroug S. et al., "Ultrasonic leaky-lamb wave imaging through a highly contrasting layer," 2003 IEEE Ultrasonics Symposium Proceedings. Honolulu, Hawaii, Oct. 5-8, 2003; [IEEE Ultrasonics Symposium Proceedings], New York, NY : IEEE, US, vol. 1, Oct. 5, 2003 (Oct. 5, 2003), pp. 794-798, XP010701614.
Borigo, Cody; Rose, J. L.; Yan, Fei, A spacing compensation factor for the optimization of guided wave annular array transducers. J. of Acoust. Soc. Am. Jan. 2013, vol. 133, No. 1, pp. 127-135, ISSN 0001-4966; p. 127, right column, second paragraph.
Clarke, T.; Cawley, P.; Wilcox, P. D.; Croxford, A. J. Evaluation of the damage detection capability of a sparse-array guided-wave SHM system applied to a complex structure under varying thermal conditions. IEEE Trans. Ultrason. Ferroelectr. Freq. Control. Dec. 2009, vol. 56, No. 12, pp. 2666-2678.
Search Report dated Aug. 30, 2019 issued in the corresponding Norwegian U.S. Appl. No. 20/190,133.
International-Type Search Report dated Sep. 26, 2019.
International Search Report and Written Opinion mailed on Apr. 30, 2020 in corresponding International Application No. PCT/NO2020/050024.
Allyne, D., "The nondestructive testing of plates using ultrasound lamb waves". Imperial college of science, technology, and medicine. University of London, Feb. 1991.
Mexican Office Action mailed in MX/a/2021/008950 on Aug. 28, 2024.
Chinese Search Report mailed in CN 202080011818.7 on Jan. 31, 2020 and its English Translation.

* cited by examiner

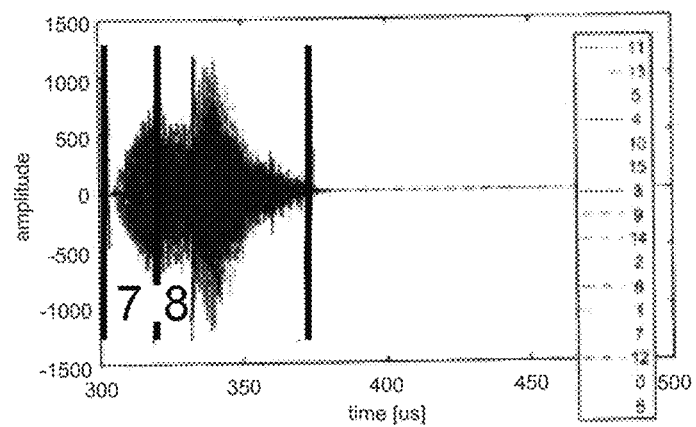
Fig. 4
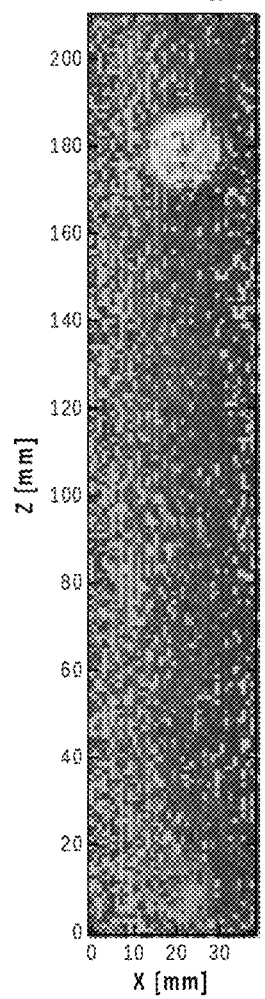 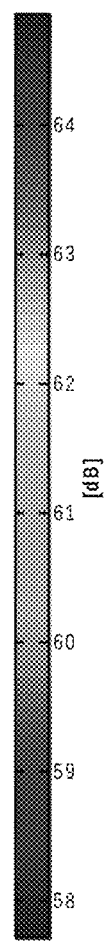 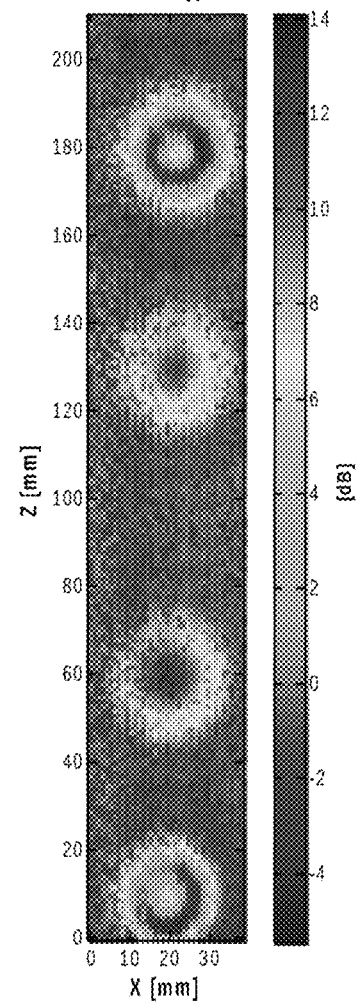
Fig. 5a  Fig. 5b

METHOD AND DEVICE FOR NON-DESTRUCTIVE TESTING OF A PLATE MATERIAL

CROSS-REFERENCE TO RELATED APPLICATIONS

This application is the National Stage entry under 35 U.S.C. § 371 of International Application No. PCT/NO2020/050024 filed on Jan. 31, 2020, published on Aug. 6, 2020 under Publication Number WO 2020/159385 A1, which claims the benefit of priority under 35 U.S.C. § 119 of Norwegian Patent Application Number 20190133 filed Jan. 31, 2019, the entireties of which are herein incorporated by reference.

FIELD OF THE INVENTION

The present invention relates to the field of non-destructive testing, and more specifically to a method and device for testing the integrity of plate materials such as the walls of oil and gas pipelines using acoustical transducers.

BACKGROUND

In the oil and gas industry, there is a need for efficient testing of pipelines. The structural integrity of pipelines may be tested using inspection pigs which travel inside the pipelines measuring the condition of the pipe wall. There have been devised several methods for measuring the condition of pipeline walls. Here we will mention methods using magnetic flux leakage and ultrasonic testing. Methods using magnetic flux leakage are mainly effective only for detecting metal loss (thinning of the pipeline wall) caused by corrosion. Ultrasonic testing methods are used for detecting corrosion and cracks in pipeline walls, even though there is some overlap between the technologies. However, conventional ultrasonic testing methods, e.g. using pulse-echo based scanning of the pipe wall, have limitations relating to the need for a liquid couplant.

From US 2009/0078049 A1 there is known a method for testing a hollow pipe including transmitting an acoustical signal into the pipe from a transmitting transducer, the signal exciting Lamb waves in the pipe, receiving an acoustical signal returned from the pipe in a receiving transducer, and processing the received signal to detect cracks in the pipe. The transducers are disposed apart and at a chosen angle with respect to the surface of the pipe to optimize the formation of and coupling to Lamb mode waves.

US 2018/0017533 A1 discloses a similar method for testing a structure using Lamb waves.

Chimenti, D. E. & Martin, R. W.: *Nondestructive evaluation of composite laminates by leaky Lamb waves*, Ultrasonics Vol. 29, January 1991 describes a method for the evaluation of fibre reinforced composite laminate plates using Lamb waves. An acoustical ultrasound signal is transmitted into the plate through the surrounding fluid (water) by a transmitting transducer and received by a receiving transducer. Effective coupling of Lamb mode signals into the plate is achieved through choosing appropriate angles and frequencies.

EP 3 407 060 A1 describes a method for estimating the state of a test object, such as a plate, involving injecting an ultrasonic signal into the plate from a first transducer mounted onto the plate and with a chosen angle towards the plate. The signal is detected in a second transducer mounted at a distance from the first transducer-ad and mounted in a corresponding way with an angle towards the plate. The document mentions that the signal travelling in the plate includes symmetrical and asymmetrical Lamb mode signals and their harmonics.

SUMMARY OF THE INVENTION

It is an object of the present invention to provide a device and method for acoustical testing of pipelines able to detect the presence of defects such as small holes or pits in the wall, pits and holes having diameters of 1.5 to 8.0 mm.

The scope of the invention is defined in the appended claims.

According to a first aspect, the invention relates to a method for testing a layered structure for the presence of pits and holes, said method including the steps of: transmitting an acoustical signal from a transmitting transducer mounted normal to the structure and positioned in a distance from the structure, receiving an acoustical signal returned from the structure in a receiving transducer also mounted normal to the structure at a distance from the structure, the receiving transducer being located in a distance from said transmitting transducer, time gating the received signal identifying a tail part carrying information from Lamb signals travelling in the structure, and determining the energy content in said Lamb mode part of the signal. The frequency of the transmitted signal is in the range 0-f, wherein f is the fundamental thickness resonance of the structure, and wherein the acoustical signal emitted from the transmitting transducer spans an angle $\Phi$ limited to four times the angle of incidence $\varphi$, where $\varphi$ is determined from:

$$\varphi = \sin^{-1}\left(\frac{C_0}{C_p}\right)$$

where $C_0$ is a longitudinal velocity of the transmitted acoustic signal in a medium between the transmitting transducer and the plate material, and $C_p$ is a phase velocity of a Lamb wave in the structure.

This method aims to extract information from Lamb waves travelling as refracted waves in the plate material. The invention is based on the finding that certain Lamb modes are particularly effective in revealing the presence of small flaws, such as pits or holes, in plate materials. This includes the $A_0$, $A_1$ and $S_0$ modes, the last one being the most preferred mode. These preferred modes may be excited, and higher order modes suppressed, by keeping the exciting acoustical signal within a specific region of frequencies and angles of incidence $\varphi$. The chosen frequency range is much lower than commonly used in non-destructive testing.

By lowering the frequency of the acoustic signals, the number of excited wave modes is reduced. Compared to common pulse echo methods, this is a method opposite of what normally would be expected.

The other parameter defining the "sweet" region is the angle of incidence. Commonly, the angle of incidence is determined by mounting the transducers with a chosen angle towards the surface of the tested structure. However, in this case the transducers are mounted normal to the surface (i.e. with the front face of a transducer parallel with the surface). The signal emitted by the transducer will be shaped as a conical lobe. Then, the outer rim of this lobe will determine the maximum angle of incidence. When the transducers are mounted in this way, a higher resolution of test areas is obtained.

According to a preferred embodiment of the invention, the frequency of the transmitted signal is in the range 0-½f.

In order to achieving a proper coupling to the structure, overcoming the large difference acoustical impedance between e.g. gas and steel, one would normally prefer to use a transmitting frequency hitting and exciting a thickness resonance of the structure. By lowering the frequency still, one will not obtain this beneficial effect. However, by lowering the frequency fewer Lamb modes will be activated concentrating the available energy into the remaining modes.

According to an embodiment of the invention, the acoustical signal emitted from the transmitting transducer spans an angle Φ of two times the angle of incidence φ.

This enhances the effect mentioned above. By tailoring the width of the signal lobe from the transducer, the number of excited wave modes may be reduced and the available signal energy concentrated into the most desired wave modes. The width of the signal lobe defines the maximum incident angle of the wave hitting the structure.

According to another aspect, the invention also relates to a device for performing the above mentioned method, the device including:

a signal generator adapted to provide a signal to a transmitting transducer mounted normal to the structure and positioned in a distance from the structure, wherein the transmitting transducer is adapted to transmit an acoustic signal towards said structure, a receiving transducer also mounted normal to the structure at a distance from the structure, the receiving transducer being located in a distance from said transmitting transducer, the receiving transducer being adapted to receive an acoustic signal received from the structure, the device further including a processing means adapted to time gate the received signal identifying a tail part carrying information from Lamb signals travelling in the structure, and to determine the energy content in said Lamb mode part of the signal, characterized in that the frequency of the transmitted signal is in the range 0-f, wherein f is the fundamental thickness resonance of the structure, and wherein transmitting transducer is adapted to emit a signal spanning an angle Φ up to four times the angle of incidence φ, where φ is determined from:

$$\varphi = \sin^{-1}\left(\frac{C_0}{C_p}\right)$$

According to a preferred embodiment of the device, the signal generator is adapted to generate a signal in the range 0-½f.

According to an embodiment the transmitting transducer is adapted to emit a signal spanning an angle Φ of two times the angle of incidence φ.

According to a first embodiment the transmitting transducer has an aperture determining the angular extent of the emitted signal.

This transducer design is used to provide a closely defined width of the transmitted acoustical signal.

According to another embodiment, the transmitting transducer has a curved front surface determining the angular extent of the emitted signal.

This design of the transducer allows more acoustical energy to be emitted by the transducer compared with the previous embodiment.

According to another embodiment, the transmitting transducer includes an annular piezoelectric element.

This design aims to reduce the acoustical energy emitted in the central part of the signal lobe, wherein more energy may be made available in the outer parts which excite the Lamb waves.

BRIEF DESCRIPTION OF THE DRAWINGS

Further aspects of the invention will appear from the following detailed description when read in connection with the appended drawings, in which:

FIG. 4 is an amplitude-versus-time diagram of a typical signal as received in said inventive device, FIG. 5a is a two-dimensional plot showing the energy content in the leading part of the received signal, and FIG. 5b shows the energy content in a later part of the signal.

DETAILED DESCRIPTION

Figure 1:
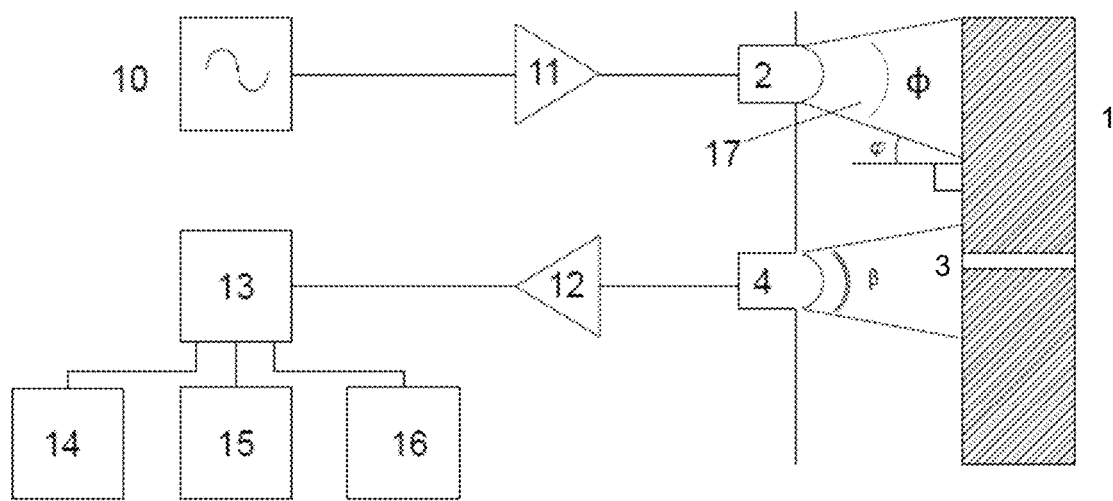
FIG. 1 is a schematic illustration of the inventive device and the electronics circuits of the device.

FIG. 1 shows the setup for detecting faults in the way of small holes and pits 3 in a plate material 1. The term plate material is meant to include any plane or curved plate of metal, wood or polymer, such as the steel hull of a ship or the wall of a pipeline. The setup includes a transmitting transducer 2 transmitting acoustical signal bursts towards the structure 1 and a receiving transducer 4, the receiving transducer 4 being mounted a short distance in the longitudinal direction from the transmitting transducer 2. The transducers are mounted directly facing the plate material. This will waste some acoustical energy, but provides the ability to look for pits and holes in any direction, a feature not offered by a setup using transducers mounted with an angle towards the structure.

The instrument setup includes electronic circuits for exciting the transducers, receive response signals from the transducers, and store the received signals. The setup includes a signal generator 10 providing the driver signal to the transmitting transducer 2, the receiving transducer 4, an amplifier 11, a preamplifier 12 and means for processing the received signal. The means will normally include a processor 13, a storage medium 16, communication interface 15 and a position detector 14. The processor 13 may also control other functions in the setup, such as the signal generator 10. The transmitting transducer will emit signals in a conical lobe 17 in front of the transducer.

The setup also includes means for displacing the transducer, not shown, allowing the transducer to scan the plate material. The normal operating setup will include a number of transducers mounted in a grid on the cylindrical outer surface of a pig adapted to travel inside a pipeline while inspecting the wall from the inside. However, the invention may also find other applications, such as inspecting flat plates or even inspecting tubular bodies from the outside, when this is accessible.

The signal from the transmitting transducer 2 will travel in the fluid inside the pipe as a compressional wave and hit the pipe wall. The incoming compressional wave will set up a corresponding acoustical signal in the wall, the signal consisting of a compressional wave part and a part of the incoming signal that is converted into various wave modes at the fluid-steel interface, such as shear and Lamb waves, both at their fundamental frequencies and their harmonics.

When leaving the wall the various wave signals will be converted back to compressional waves travelling in the fluid to the receiving transducer 4.

Even though the received signal only includes compressional mode energy, several techniques may be used to resolve which parts of the received signal that is produced by different wave modes, i.e. when travelling in the pipe wall.

It has been found that certain wave modes are more effective in displaying defects present in the structure. Effective signals for detecting pits and holes in the wall are the Lamb waves, and in particular the fundamental or first symmetric Lamb mode, here called $S_0$, but also its harmonics.

When injecting a signal into a plate material, resonance peaks are found at frequencies where the thickness of the plate material is an integer number of half wavelengths. The frequency f of a thickness resonance is defined as f=nc/2D, where c is the acoustical compression velocity of the plate material, D its thickness and n denoting the harmonic. Injecting the signal at a thickness resonance frequency will enhance the coupling to the plate material.

Below said fundamental thickness resonance, the Lamb modes $A_0$, $S_0$ and $A_1$ may occur, depending on the angle of incidence.

At even lower frequencies, below half of the fundamental thickness resonance, only the fundamental Lamb modes $A_0$ and $S_0$ will occur. It is of course an advantage to limit the transmitted signal to this frequency range, to concentrate the injected energy into these two modes only.

Figure 2:
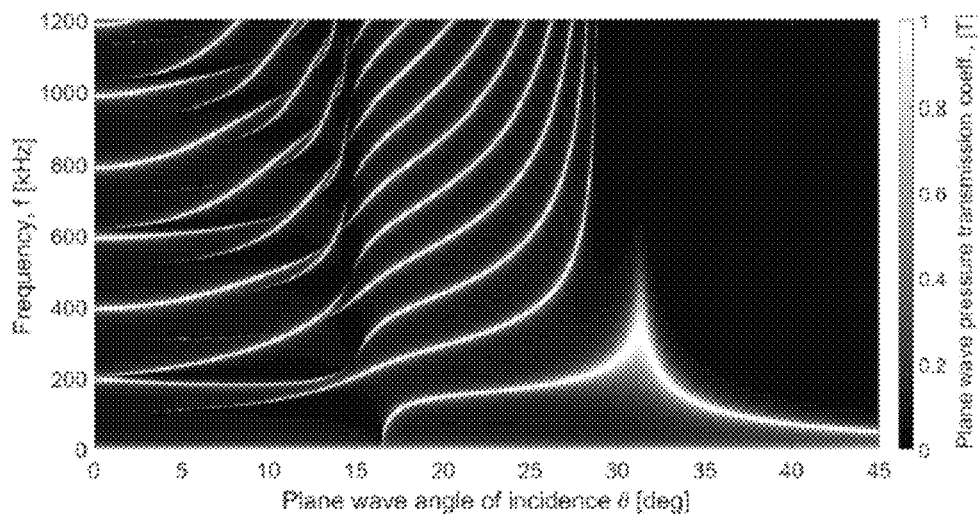
FIG. 2 is a diagram showing the transmission coefficient as a function of frequency and angle of incidence.

However, the incident angle of the transmitted wave will also determine which modes that are activated. This is illustrated in FIG. 2 as a diagram showing the transmission coefficient as a function of frequency and angle of incidence. In the case shown in FIG. 2, an acoustical signal is transmitted in water towards a steel plate. With a wave transmitted in the range 0-½ f, f being the first or fundamental thickness resonance, and the transmitted wave is hitting the plate at an incident angle in the range from 17° to about 40°, only the $S_0$ mode will be present. In the large end, this is dependent on the frequency, as illustrated in FIG. 2. At larger incident angles, also the $A_0$ mode may occur. It is preferred to limit the incident angle to a small area around 17° to maximize the acoustical energy injected as $S_0$ mode waves, as a broader wave lobe will spread the energy. This angle of incidence is dependent on the relationship between the acoustical velocities in the bordering media. The acoustical velocity in steel is fairly constant. However, the acoustical velocity in a gas is very different from the acoustical velocity in a liquid. The optimum incident angle of 17° mentioned above relates to water only. In nitrogen (at atmospheric pressure) it will be close to 4° and in oil about 18°. In the present case, it is preferred to make the investigation of the pipeline in a homogeneous environment only involving gas, water or oil. Thus, the instrument setup has to be tailored to provide the correct angle of incidence with the fluid present in the pipeline. This angle may have to be found by measurements in the fluid concerned, or by solving the below Rayleigh-Lamb equations, and identifying the $S_0$ mode:

$$\frac{\tan\left(\frac{\beta d}{2}\right)}{\tan\left(\frac{\alpha d}{2}\right)} = \frac{4\alpha\beta k^2}{(k^2 - \beta^2)^2}$$

and $$\frac{\tan\left(\frac{\beta d}{2}\right)}{\tan\left(\frac{\alpha d}{2}\right)} = \frac{(k^2 - \beta^2)^2}{4\alpha\beta k^2}$$

where $$\alpha^2 = \frac{\omega^2}{C_l^2} - k^2 \text{ and } \beta^2 = \frac{\omega^2}{C_t^2} - k^2$$

and where $\omega$ is the angular frequency, k the wave number, $C_l$ and $C_t$ are the longitudinal and shear wave velocities respectively, and d is the thickness of the plate.

The first equation relates to the propagation of symmetrical Lamb waves in a plate, while the second inverted equation relates to the propagation of asymmetrical Lamb waves in a plate.

If the longitudinal velocity of the medium between the transmitter and the plate is $C_0$, the incidence angle $\varphi$ required for the excitation of the desired mode is found to be:

$$\varphi = \sin^{-1}\left(\frac{C_0}{C_p}\right)$$

where $C_p$ is the phase velocity in the structure ($C_p=\omega/k$).

Thus, for the purpose of exciting the fundamental symmetrical Lamb mode, the optimum conditions will be to inject an acoustical signal at a frequency of half the fundamental thickness resonance and at an angle of incidence in the range $\varphi$ to $2\varphi$.

The incident angle $\varphi$ in question is defined by the outer rim of the transmitter lobe 17 shown in FIG. 1, the lobe width angle $\Phi$ spanning about two times the incident angle $\varphi$. A defined lobe width angle $\Phi$ may be achieved by either using a transducer with a small aperture, providing the transducer with a curved (convex) front surface, or by placing an acoustic lens in front of the transducer.

Figure 3A:
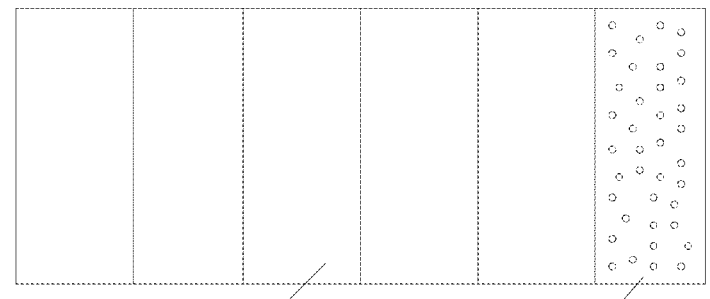
FIG. 3a-c is schematic sectional drawings of acoustical transducers that may be used in the invention.

FIG. 3a shows a conventional piezoelectric transducer consisting of a stack of piezoelectric elements 31 terminated in a transition element 32 improving the acoustical coupling to the outside medium. The aperture of the transducer, defined as the angle between the −6 dB points of the main signal lobe is given by $$\theta_{-6dB} \approx \sin^{-1}\left(\frac{2.215}{ka}\right),$$

where k=w/$c_0$, w being the angular frequency, $c_0$ is the sound velocity in the surrounding medium and a is the radius of the transducer.

Figure 3B:
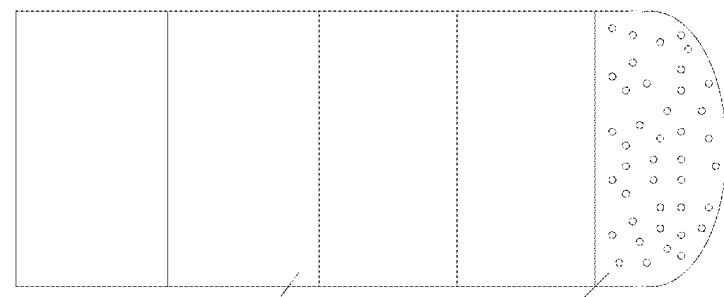

FIG. 3b shows an optional transducer for use in the inventive setup. Here, the stack of piezoelectric elements 31 is somewhat wider than in the version shown in FIG. 3a, and the adaption of the lobe width to the desired incident angle is achieved by providing the transition element 32 with a curved outer surface. The larger dimensions of the piezoelectric elements allow the transducer to emit a stronger signal.

Figure 3C:
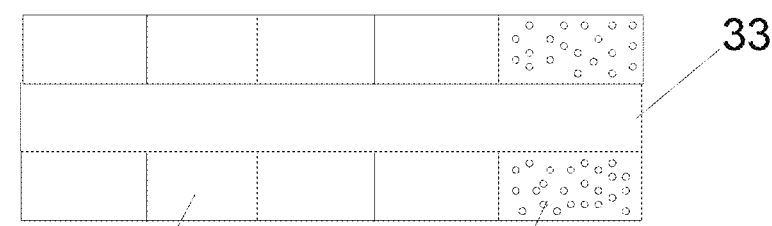

The transducer designs shown in FIGS. 3a and 3b limits the width of the signal lobe to avoid exciting unnecessary acoustical modes. This means that the signal energy is concentrated into the desired Lamb modes, and most preferably into the $S_0$ mode only. However, the energy emitted in the central part of the lobe will hit the wall at smaller incident angles (i.e. normal or near normal to the structure) and will not contribute to the formation of Lamb signals and is in fact a waste of energy. In FIG. 3c there is shown a toroidal (annular, ring shaped) transmitting transducer designed to emit less energy in the central part of the lobe. This transducer includes a stack of piezoelectric elements 31 and a transition element 32 as in the previous embodiments, but here there has been drilled a hole 33 through the central part of the stack. However, the formula for the lobe width given above does not apply here. In this case one has to exploit the side lobes from the transducer. The central lobe will be less predominant, and side lobes will appear stronger. The position of these side lobes may be determined by careful design of the transducer.

The received signal shown in FIG. 4 consists of a signal onset part 7 including the part of the compressional wave that has been reflected from the surface of the layered structure (echo). The signal also includes a tail 8 that includes the part of the signal that has travelled in the structure.

Then, if a time gating (window) is applied to the received signal extracting the part of the signal occurring in the tail 8, the signal will predominantly be influenced by the $S_0$ Lamb wave, considering the above conditions with regard to frequency and incident angle of the impinging signal.

FIG. 5a, b illustrates the magnitudes of signals returned from a rectangular flat plate, 26 mm thick, which is immersed in water. The transducer is placed 90 mm above the plate and excites the plate with a chirp signal of 20 μS duration. In the plate there are four holes of 8.0, 2.0, 1.5 and 4.0 mm diameter, respectively, as seen from the top end of the plate to the bottom.

FIG. 5a shows the energy in the signal from the leading (echo) part. Only the largest hole may be discerned, using a suboptimal transducer lobe.

FIG. 5b shows the energy in the tail part. The 8.0 and 4.0 mm holes "suck" energy providing a large contrast to the surrounding plate. The smaller holes of 2.0 and 1.5 mm diameter provide a much lower contrast, but are nevertheless clearly visible.

The invention claimed is:

1. A method for testing a plate material for presence of pits and holes, said method including the steps of:
   transmitting an acoustical signal from a transmitting transducer mounted normal to the plate material and positioned a distance from the plate material,
   receiving an acoustical signal returned from the plate material in a receiving transducer also mounted normal to the plate material at a distance from the plate material, the receiving transducer being located in a distance from said transmitting transducer,
   time gating the received acoustic signal to identify a tail part of the received acoustic signal carrying information of Lamb signals travelling in the plate material, and
   determining energy content in a Lamb mode in said tail part of the received acoustic signal,
   wherein a frequency of the transmitted acoustic signal is in the range 0-f, wherein f is the fundamental thickness resonance of the plate material, and
   wherein the acoustical signal transmitted from the transmitting transducer spans an angle Φ up to four times an angle of incidence φ, where φ is determined from:

$$\varphi = \sin^{-1}\left(\frac{C_0}{C_p}\right)$$

where $C_0$ is a longitudinal velocity of the transmitted acoustic signal in a medium between the transmitting transducer and the plate material and $C_p$ is a phase velocity of a Lamb wave in the plate material.

2. A method according to claim 1, wherein the frequency of the transmitted acoustic signal is in the range 0-½f.

3. A method according to claim 1, wherein the acoustical signal transmitted from the transmitting transducer spans an angle Φ up to two times the angle of incidence φ.

4. A device for testing a plate material for presence of pits and holes, the device including:
   a signal generator adapted to provide a signal to a transmitting transducer mounted normal to the plate material and positioned a distance from the plate material, wherein the transmitting transducer is adapted to transmit an acoustic signal towards said plate material,
   a receiving transducer also mounted normal to the plate material and also positioned a distance from the plate material, the receiving transducer being located a distance from said transmitting transducer, the receiving transducer being adapted to receive an acoustic signal received from the plate material,
   the device further including a processing means adapted to time gate the received acoustic signal to identify a tail part of the received acoustic signal carrying information of Lamb signals travelling in the plate material, and to determine energy content in a Lamb mode in said tail part of the received acoustic signal,
   wherein a frequency of the transmitted acoustic signal is in the range 0-f, wherein f is the fundamental thickness resonance of the plate material, and
   wherein the transmitting transducer is adapted to transmit the acoustic signal spanning an angle Φ up to four times the angle of incidence φ, where φ is determined from:

$$\varphi = \sin^{-1}\left(\frac{C_0}{C_p}\right)$$

where $C_0$ is a longitudinal velocity of the transmitted acoustic signal in a medium between the transmitting transducer and the plate material, and $C_p$ is a phase velocity of a Lamb wave in the plate material.

5. A device according to claim 4, wherein the signal generator is adapted to provide a signal to the transmitting transducer to transmit the acoustic signal in the range 0-½f, wherein f is the fundamental thickness resonance of the plate material.

6. A device according to claim 4, wherein the acoustical signal transmitted from the transmitting transducer spans an angle Φ up to two times the angle of incidence φ.

7. A device according to claim 4, wherein the transmitting transducer has an aperture determining an angular extent of the transmitted acoustic signal.

8. A device according to claim 4, wherein the transmitting transducer has a curved front surface determining an angular extent of the transmitted acoustic signal.

9. A device according to claim 4, wherein the transmitting transducer includes an annular piezoelectric element.

\* \* \* \* \*